United States Patent Office 3,032,783
Patented May 8, 1962

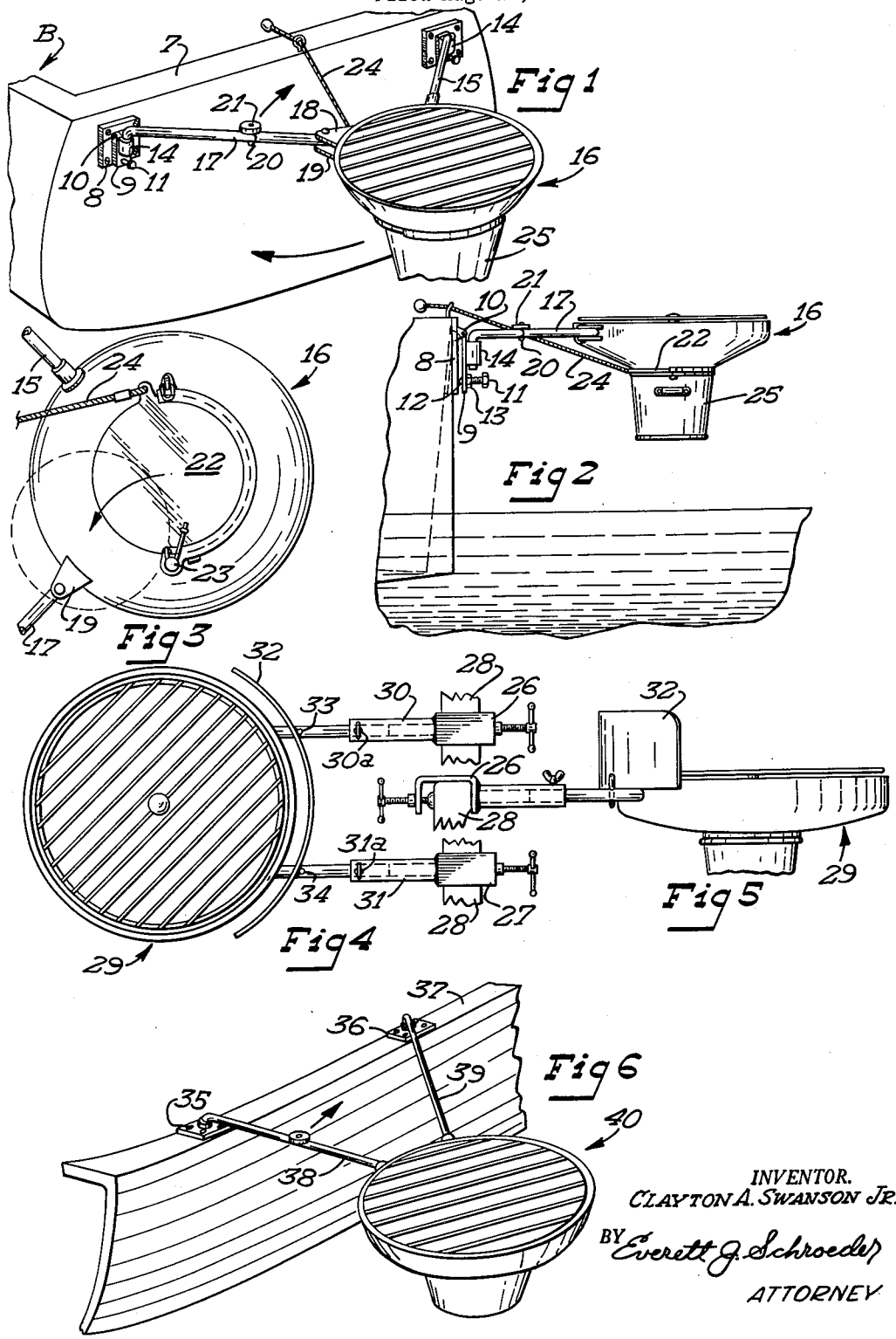

3,032,783
COMBINATION BOAT AND GRILL
Clayton A. Swanson, Jr., Rte. 3, Excelsior, Minn.
Filed Aug. 29, 1960, Ser. No. 52,471
10 Claims. (Cl. 9—1)

This invention relates to outdoor entertainment devices. More particularly it relates to outdoor cooking devices mounted on the exterior of a boat for use in the entertainment of guests, family members, and friends.

It has become increasingly common among those who live upon shores of bodies of water, and even others, to entertain their friends and guests as well as their immediate family upon various types of boats such as cruisers, run-abouts, pontoons, etc. There has been an ever increasing number of people who are fond of the outdoors and purchase boats and trailers therefore to enable them to visit various different bodies of water for such purposes. In such entertainment activities, the provision of adequate food, and particularly hot food, often presents a difficult problem the solution of which is complicated by the excessive danger of fire, etc. in such watercraft.

Although boat owners may obtain hot food by various other methods, of course, it is generally recognized that a hot charcoal broiled steak, if provided, adds much to the overall enjoyment of such entertainment activities. I have found, however, that the dangers and inconveniences involved in attempting to broil a steak upon a boat are such as to discourage most boat owners from attempting to provide this added entertainment feature. In addition, the disapproval of insurance underwriters for use of open flame cooking devices such as broilers upon boats, make such activities inadvisable. My invention is designed to overcome these disadvantages and inconveniences.

It is a general object of my invention to provide novel and simple means for inexpensively preparing hot food such as steaks while traveling upon a boat.

A more specific object is to provide simple and inexpensive means whereby the operator or passenger upon a boat may safely and conveniently broil a steak or prepare other hot food upon an open flame outdoor cooking device without disembarking from the boat.

Another object is to provide safe and economical means for preparing hot food such as steaks upon an open fire outdoor cooking device without disembarking from the boat with a minimum of discomfort and effort, and without diminishing the seating capacity of the boat.

Another object is to provide novel means for attachment to a boat which is so constructed and arranged to permit ready access to an open flame cooking device when desired and to permit movement of the device to a relatively remote position if and when desired to eliminate smoke and excessive heat.

Another object is to provide simple, inexpensive, and novel means for enabling the boat passengers to prepare a charcoal broiled steak with comfort, safety and convenience without disembarking from the boat and to permit the disposal of the burning embers with a minimum of inconvenience and discomfort at the end of the boating operation.

These and other objects and advantages of my invention will more fully appear from the following description, made in connection with the accompanying drawings, wherein like reference characters refer to the same or similar parts throughout the several views, and in which:

FIG. 1 is a perspective view of a preferred embodiment of my invention mounted upon the transom of a boat and being swingable inwardly to a position immediately adjacent the boat and outwardly to a relatively remote position.

FIG. 2 is a side elevational view of the same.

FIG. 3 is a plan view of the broiler shown in FIGS. 1 and 2 with the receptacle removed.

FIG. 4 is a plan view of a second embodiment of my invention.

FIG. 5 is a side elevational view of the embodiment shown in FIG. 4.

FIG. 6 is a perspective view of a third embodiment of my invention mounted upon the gunwale of a boat and within the oarlocks thereof.

The embodiment shown in FIGS. 1–3 is mounted upon the transom 7 of a boat indicated generally by the letter B. As shown, it includes a pair of mounting brackets at opposite ends of the transom each identically constructed. The parts of each, for the sake of convenience, have been identified by the same numerals in view of their identical construction.

These brackets include a mounting block or plate 8 which pivotally mounts a hinge plate 9 for pivotal movement about a horiontal axis 10. Extending through the lower portion of the hinge plate 9 is a spacer bolt 11 which is threadedly received within an opening provided therefor in the lower portion of the pivot plate 9 and has its inner end 12 bearing against the block 8. A lock nut 13 is also provided to aid in holding the bolt 11 in the desired position so that the pivot plate 9 may be set at any angle relative to the block 8 to compensate for the change of attitude of the transom 7 when the boat moves at different speeds. A vertically extending sleeve 14 is welded or otherwise fixedly secured to the exterior of the pivot plate 9.

Pivotally received within one of the sleeves 14 is a pivot arm 15 which is fixedly secured at its opposite and outer end to an outdoor cooking device of the open flame type such as the grill 16. The outdoor grill 16 thus can swing about the vertical axis of the sleeve 14 within which the pivot arm 15 is pivoted. A second but jointed pivot arm 17 is pivotally mounted within the other sleeve 14 and has its outer end pivotally connected to the grill by means of vertically spaced pivot brackets 18 and 19 which are fixedly secured to the grill 16 in supporting relation as best shown in FIG. 1. The pivot arm 17 is jointed as at 20 and is provided with manual tightening means 21 to hold the two sections thereof in fixed relation to each other when desired.

The bottom of the grill 16 is a plate 22 which pivots about a vertical axis 23 and can be swung to open position by pulling upon the cable 24 as best illustrated in FIG. 3. A closed receptacle 25 is snugly secured to the bottom or lower portion of the grill 16 so that when the plate 22 is swung to open position the burning embers within the grill 16 may drop into the container 25 where they will gradually smother after the plate 22 returns to its closed position. In this connection it will be noted that the plate 22 is spring loaded to constantly urge the plate toward closed position.

FIGS. 4 and 5 show a second form of my invention wherein there is provided a pair of clamp members 26 and 27 adapted to be tightened so as to positively engage the gunwales 28 of a boat and to support an outdoor grill indicated generally by the numeral 29 of the type shown in FIG. 1. The grill 29 is supported by a pair of telescoping support arms 30 and 31 which are fixedly secured to the upper edge portion of the grill 29 as best shown in FIG. 5. These support arms 30 and 31 have clamping means 30a and 31a by means of which the grill 29 may be moved to a position of relatively close proximity to the gunwales 28 or may be extended to a relatively remote position.

Carried by the support arms 30 and 31 is a protective shield member 32 which, as shown, is positioned between the gunwale 28 and the grill 29 and extends upwardly above the upper edge of the latter as best shown in FIG. 5. This shield 32 is positively fixed to the support arms 30 and 31 as at 33 and 34 by welding or some other suitable methods. The function of the shield is believed obvious in that it will deflect the heat rays from the burning coals carried within the outdoor grill 29 while the steaks are being broiled and thus will aid in eliminating discomfiture of the passengers of the boat upon which the open flame cooking device is mounted.

FIG. 6 shows a third form of my invention wherein the oarlocks 35 and 36 carried by the gunwale 37 of the boat which is shown only fragmentarily serve as pivot supports for the support arms 38 and 39 which carry the outdoor grill indicated in general by the numeral 40. The outdoor grill is preferably of the type shown in FIG. 1 and the support arms 39 is similar in structure to that of the support arm 15 of FIG. 1 while the support arm 38 is jointed and otherwise similar to the support arm 17 also shown in FIG. 1. As shown the depending inner end portion of the arms 38 and 39 are received within the socket of the oarlocks 35 and 36 and provide ready pivot means therefor so that when the jointed support arm 38 is swung inwardly in the direction of the arrow, as shown in FIG. 6, the grill 40 may be swung to a position alongside the gunwale of the boat. When it is desired to continue the broiling of the steaks when they have been turned or seasoned, the support arm 38 may be moved to the extended position shown in FIG. 6 whereat it is at a relatively remote position relative to the occupants of the boat.

From the above it will be readily appreciated that I have provided a novel, simple and relatively inexpensive means for entertaining guests on a body of water in a much more satisfactory manner in that through the use of my invention it is possible to grill steaks and prepare other hot foods while remaining on the boat with an absolute minimum of discomfiture, danger and inconvenience. It will be noted that the grills in each form of the invention may be moved to an extended relatively remote position disposed laterally of the boat and, when desired, may be swung to a relatively close proximity so that the food may be attended briefly and then again moved to a more remote position whereat the occupants of the boat will not be subjected to heat, smoke, etc. It will be noted that when in the extended position, each of the forms of my invention carries the grill at a laterally disposed location which is sufficiently remote so that there is no substantial danger, discomfiture or inconvenience to the occupants of the boat and yet the occupants may enjoy all of the advantages of an outdoor grill just as if they were ashore.

It will be noted that when the hot coals are no longer needed it is a simple matter to dispose of them with my grill by merely pulling the cable 24 so as to cause the closure plate 22 to swing to open position whereupon the coals will drop into the container 25 and will soon smother upon the closing of the plate 22. Thus by the time the boat reaches shore and the entertainment period has been completed the grill will no longer be hot and can be handled with convenience and the coals may be disposed of very quickly and easily with a minimum of inconvenience. It will be noted that the attitude of the grill 16 may be varied according to the attitude of the boat by merely adjusting the adjustment lug 11. This feature may be desired and utilized in the event the forward or rear part of the boat is heavily ladened or in the event it is desired to maintain the boat in motion because of lack of air movement etc. during the hotter portions of the season.

It will, of course, be understood that various changes may be made in the form, details, arrangement and proportions of the parts without departing from the scope of my invention which consists of the matter shown and described herein and set forth in the appended claims.

What is claimed is:

1. Outdoor entertainment apparatus having in combination a boat, an outdoor grill, and adjustable mounting structure secured to the exterior of said boat and extending between said boat and said grill and mounting the latter upon said boat in laterally spaced relation exteriorly thereof in fixed relation to said boat, said structure being adjustable to permit said grill to be alternatively moved between a position immediately adjacent said boat and a relatively remote position whereby food may be prepared upon said grill without endangering the safety and comfort of the passengers of said boat when in said latter position and may be attended by a boat passenger when said grill is in said former position.

2. The structure defined in claim 1 wherein said mounting structure is connected to said boat at two substantially spaced points and is fixedly connected at its outer end to said grill against relative movement therebetween about a horizontal axis.

3. The structure defined in claim 1 wherein said mounting structure is comprised of a generally triangular shaped open framework pivotally connected at its inner ends directly to said boat.

4. The structure defined in claim 1 wherein said mounting structure includes means for varying the angle at which said structure extends relative to said boat and hence the angle at which said grill is supported relative to said boat to permit compensation for the attitude of the boat while the latter is traveling through the water.

5. The structure defined in claim 1 wherein said mounting structure includes a pivotal connection at the exterior surface of said boat which permits said mounting structure to pivot thereabout between said adjacent and remote positions and a connection between said grill and the remainder of said mounting structure preventing movement of said grill relative to said mounting structure about a horizontal axis.

6. Outdoor entertainment apparatus having in combination a boat, an outdoor open-flame cooking device including a grill and a vertically extending housing surrounding its source of heat and extending upwardly to its grill, and adjustable mounting structure extending between said boat and said device and mounting the latter upon said boat in laterally spaced relation exteriorly thereof with its grill in fixed horizontal relation to said boat, said structure being adjustable to permit said device to be moved between a position immediately adjacent said boat and a relatively remote position whereby food may be prepared upon said device without endangering the safety and comfort of the passengers of said boat when in said latter position and may be attended by a boat passenger from within said boat when said device is in said former position.

7. The structure defined in claim 6 wherein said mounting structure includes a support arm swingable about a vertical axis and connected to said device against relative movement therebetween about a horizontal axis.

8. The structure defined in claim 6 wherein said mounting structure includes a support arm swingably mounted on said boat and swingable about an upright axis at its inner end portion and pivotally connected to said device for relative movement therebetween about only a vertical axis, and adjustable linkage extending transversely of said support arm between said boat at a point spaced from said axis and said support arm at a point disposed outwardly of said axis whereby the proximity of said device relative to said boat may be readily varied.

9. The structure defined in claim 6 wherein said device has an openable bottom member capable of being moved to an open position to facilitate the ready removal of coals or the like from said device.

10. Outdoor entertainment apparatus having in combination a boat, an enclosed outdoor open-flame cooking device, and mounting structure extending between said boat and said device and pivotally connected to the latter for relative movement therebetween about only a vertical axis and mounting the latter upon said boat in laterally spaced relation exteriorly thereof and at a relatively remote position whereby hot food may be prepared upon said device without endangering the safety and comfort of the passengers of the boat.

References Cited in the file of this patent

UNITED STATES PATENTS

| | | |
|---|---|---|
| 1,848,064 | Oishei | Mar. 1, 1932 |
| 2,520,412 | Jensen | Aug. 29, 1950 |
| 2,912,972 | Leyen | Nov. 17, 1959 |